United States Patent
Ogawa

(10) Patent No.: US 8,484,322 B2
(45) Date of Patent: Jul. 9, 2013

(54) NETWORK RECONFIGURATION METHOD AND ROUTER

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 723 days.

(21) Appl. No.: 12/028,159

(22) Filed: Feb. 8, 2008

(65) Prior Publication Data

US 2008/0198766 A1 Aug. 21, 2008

(30) Foreign Application Priority Data

Feb. 15, 2007 (JP) ................................ 2007-035461

(51) Int. Cl.
*G06F 15/177* (2006.01)

(52) U.S. Cl.
USPC ........... 709/221; 709/220; 709/224; 370/401; 370/352

(58) Field of Classification Search
USPC ........................................................ 709/221
See application file for complete search history.

(56) References Cited

U.S. PATENT DOCUMENTS

| | | | | |
|---|---|---|---|---|
| 6,965,936 | B1 * | 11/2005 | Wipfel et al. ................. | 709/224 |
| 7,031,299 | B2 * | 4/2006 | Chaudhuri et al. ............. | 370/352 |
| 7,269,176 | B1 * | 9/2007 | Molinari ....................... | 370/401 |
| 7,305,459 | B2 * | 12/2007 | Klemba et al. ................ | 709/220 |
| 2003/0053441 | A1 * | 3/2003 | Banerjee ....................... | 370/352 |
| 2005/0273853 | A1 * | 12/2005 | Oba et al. ...................... | 726/22 |
| 2005/0278784 | A1 * | 12/2005 | Gupta et al. ................... | 726/23 |
| 2007/0180120 | A1 * | 8/2007 | Bainbridge et al. ........... | 709/226 |
| 2007/0293951 | A1 * | 12/2007 | Takahashi et al. ............. | 700/1 |
| 2008/0151906 | A1 * | 6/2008 | Kolli et al. ................ | 370/395.31 |

FOREIGN PATENT DOCUMENTS

| | | |
|---|---|---|
| JP | 6-77960 | 3/1994 |
| JP | 9-321800 | 12/1997 |
| JP | 2002-232463 | 8/2002 |
| JP | 2005-192027 | 7/2005 |
| JP | 2005-223598 | 8/2005 |

OTHER PUBLICATIONS

Cisco Systems, "IP Addressing and Subnetting for New Users", Nov. 24, 2004, Cisco Systems, all pages.*
Wayback machine identfied publication date for Cisco Systems, "IP Addressing and Subnetting for New Users".*
Notification of Reason for Refusal dated May 10, 2011, from corresponding Japanese Application No. 2007-035461.

* cited by examiner

*Primary Examiner* — Hua Fan
(74) *Attorney, Agent, or Firm* — Katten Muchin Rosenman LLP

(57) ABSTRACT

Disclosed is a method for reconfiguring a network including a plurality of routers each having a redundant function. According to the method, when the network is separated into a plurality of partial networks each including at least one of the plurality of routers, each of the separated plurality of partial networks is reconfigured as a subnet so as to transfer packets between the each of the plurality of partial networks and a network other than the plurality of partial networks via one of the plurality of routers included in the each of the plurality of partial networks.

10 Claims, 16 Drawing Sheets

| Packet Identification Mark | Source IP Address | Destination IP Address | Type Code 703 | Control Information 704 |
|---|---|---|---|---|
| P101 | AA.BB.EE.1 (Router 200) | AA.BB.DD.1 (Router 100) | 0 (IP Address Count Request) | - |
| P102 | AA.BB.DD.1 (Router 100) | AA.BB.EE.1 (Router 200) | 1 (IP Address Count Value Notification) | IP Address Count =31 |
| P103 | AA.BB.EE.1 (Router 200) | AA.BB.DD.1 (Router 100) | 2 (IP Address Block Change Notification) | IP Address Block = AA.BB.CC.64/26 |
| P104 | AA.BB.EE.1 (Router 200) | AA.BB.FF.1 (Operator Terminal) | 3 (Reconfiguration Result Notification) | Reconfiguration Result =0 (Completion of Reconfiguration) |
| P105 | AA.BB.DD.1 (Router 100) | AA.BB.FF.1 (Operator Terminal) | 3 (Reconfiguration Result Notification) | Reconfiguration Result =0 (Completion of Reconfiguration) |

FIG. 13

| Packet Identification Mark | Source IP Address | Destination IP Address | Type Code 703 | Control Information 704 |
|---|---|---|---|---|
| P101 | AA.BB.EE.1 (Router 200) | AA.BB.DD.1 (Router 100) | 0 (IP Address Count Request) | - |
| P102 | AA.BB.DD.1 (Router 100) | AA.BB.EE.1 (Router 200) | 1 (IP Address Count Value Notification) | IP Address Count =31 |
| P103 | AA.BB.EE.1 (Router 200) | AA.BB.DD.1 (Router 100) | 2 (IP Address Block Change Notification) | IP Address Block = AA.BB.CC.64/26 |
| P104 | AA.BB.EE.1 (Router 200) | AA.BB.FF.1 (Operator Terminal) | 3 (Reconfiguration Result Notification) | Reconfiguration Result =0 (Completion of Reconfiguration) |
| P105 | AA.BB.DD.1 (Router 100) | AA.BB.FF.1 (Operator Terminal) | 3 (Reconfiguration Result Notification) | Reconfiguration Result =0 (Completion of Reconfiguration) |

FIG. 15

| Packet Identification Mark | Source IP Address | Destination IP Address | Type Code | Control Information |
|---|---|---|---|---|
| P201 | AA.BB.EE.1 (Router 200) | AA.BB.DD.1 (Router 100) | 0 (IP Address Count Request) | - |
| P202 | AA.BB.DD.1 (Router 100) | AA.BB.EE.1 (Router 200) | 1 (IP Address Count Notification) | IP Address Count =31 |
| P203 | AA.BB.EE.1 (Router 200) | AA.BB.DD.1 (Router 100) | 3 (Reconfiguration Result Notification) | Reconfiguration Result =1 (Unable to Reconfigure) |

NETWORK RECONFIGURATION METHOD AND ROUTER

BACKGROUND OF THE INVENTION

1. Field of the Invention

The present invention relates to a network reconfiguration method, and more particularly to a network reconfiguration method and a router, by which if a network is separated due to shutdown of a communication link between relay units in the network, redundant routers reconfigure the separated networks as new subnets.

2. Description of the Related Art

Along with recent widespread use of an IT, a small-scale network such as a SOHO has been increased. Upon the configuration of the small-scale network, it is necessary to configure the network with a low cost and high reliability. For that purpose, a router is placed at a connection point with a WAN and the other portion is configured using a Layer2 network. On the other hand, the router or network configuration is set redundant to ensure a high reliability.

FIG. 1 shows an example of a network configuration that is redundant.

A network 300 is connected to a center side router 500 through a WAN 400. At this time, a router having a function of routing packets between the network 300 and the WAN 400 is designed as a dual-redundant system to ensure a high reliability; a master router 910 and a backup router 920 are provided. In the small-scale network, a relay unit for routing packets in the network 300 is configured using, for example, LS-SWs 91 and 92 as a Layer2 relay unit.

In addition, the redundant network is achieved using communication links 34 and 35 as indicated by the dotted lines of FIG. 1. As a result, a communication link 33 can be backed up even when being shut down.

However, the Layer2 relay unit (for example, a bridge) having a function of imparting redundancy to the network requires a higher device cost than a relay unit (for example, a hub) having no redundancy function. Thus, in the small-scale network configuration, it is desirable to use redundant routers only for a relay point with the WAN 400 and configure the other relay units in the network 300 using relay units (hub etc.) having no network redundancy function.

A VRRP (virtual router redundancy protocol) prescribed by the IETF (the Internet engineering task force) exemplifies a technique of controlling the above redundant routers. Japanese Unexamined Patent Application Publication No. 2002-232463 discloses a network configuration example based on the VRRP.

Further, an STP (spanning tree protocol) has been well known as another technique of controlling the redundant network.

SUMMARY

According to an embodiment, there is provided a method for reconfiguring a first network including a plurality of routers each having a redundant function. The method comprises: detecting a separation of the network into a plurality of partial networks each including at least one of the plurality of routers; performing a reconfiguration procedure of reconfiguring each of the plurality of partial networks as a subnet, so as to transfer packets between the each of the plurality of partial networks and a second network other than the plurality of partial networks via one of the plurality of routers included in the each of the plurality of partial networks. The reconfiguration procedure can be configured to comprises: redefining an IP address block which is information defining a subnet and including a host address portion for storing a relative position of an IP address within the subnet, for each of the plurality of partial networks, and reassigning IP addresses to devices included in each of the plurality of partial networks on the basis of the redefined IP address block.

According to the embodiment, if a first network is separated due to a network failure such as shutdown of a communication link between relay units for routing packets in the first network, routers, which have redundant functions and routes packets to a second network, reconfigure the separated partial networks as new subnets, whereby a first network configured using relay units (for example, hubs) having no network failure tolerant function can continue packet transfer in the event of a network failure. Accordingly, a high-reliability network can be configured without requiring redundant network configuration at a low device cost.

BRIEF DESCRIPTION OF THE DRAWINGS

FIG. 13 shows an example of a control packet usage according to the embodiment;

FIG. 15 shows an example of a control packet usage according to the embodiment;

DESCRIPTION OF THE PREFERRED EMBODIMENTS

Figure 2:
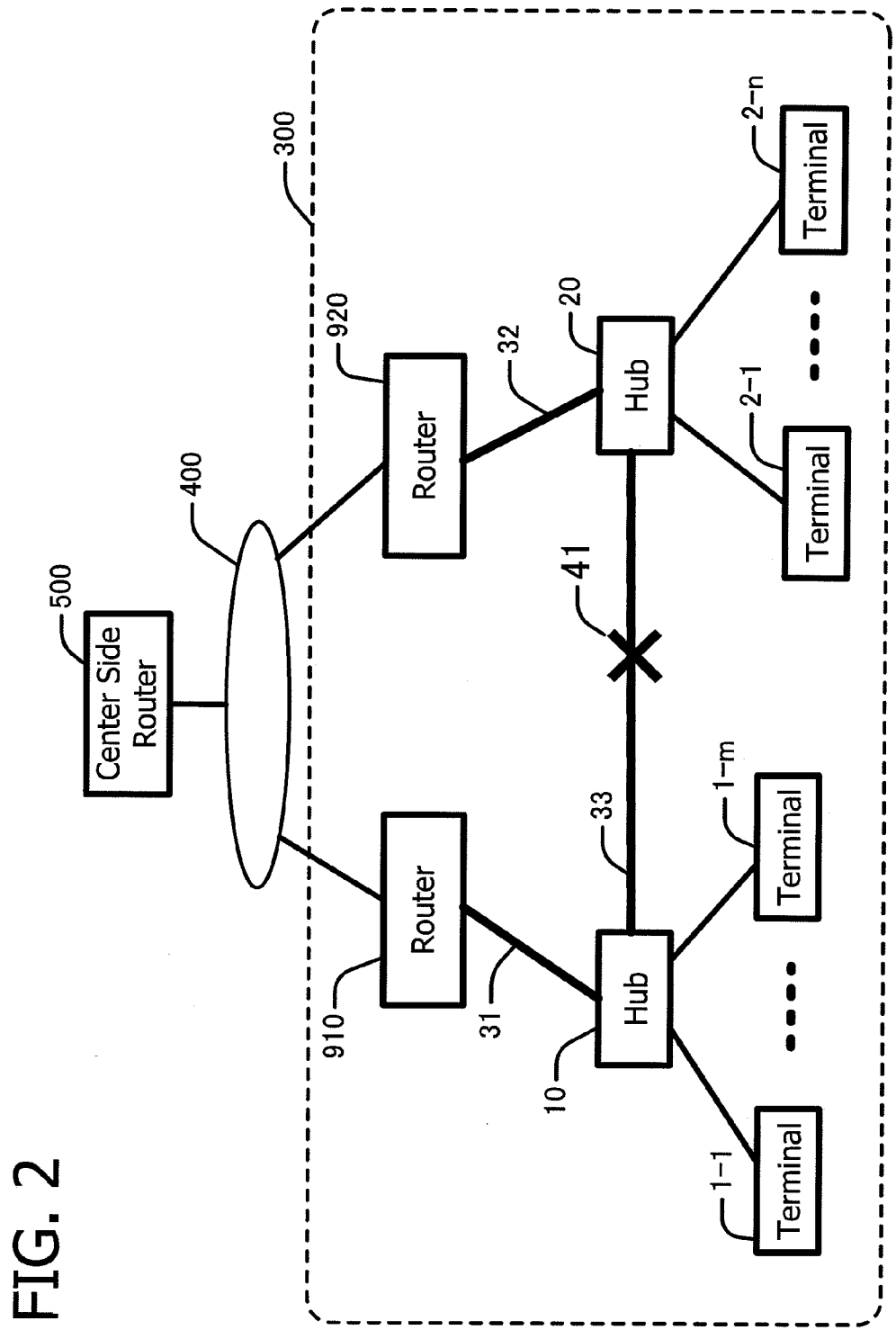
FIG. 2 shows an example of a network configuration that is not redundant.

FIG. 2 shows an example of a network configuration that is not redundant.

Figure 1:
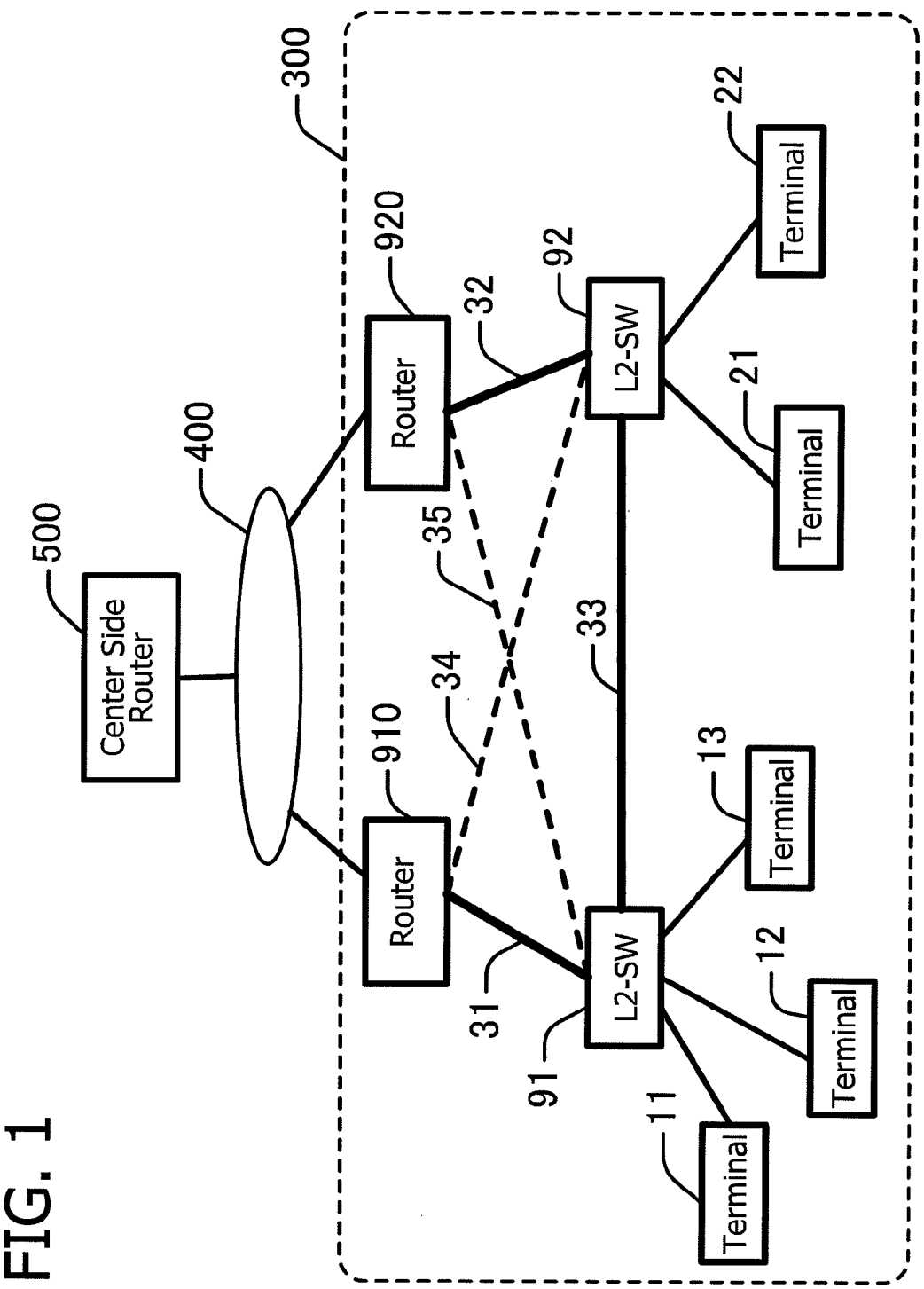
FIG. 1 shows an example of a network configuration that is redundant.

In this example, routers having a function of routing packets to/from an external network are only configured as redundant routers, and hubs having no network redundancy function are used as relay units 10 and 20 for routing packets in the network 300. In this case, if the communication link 33 is shut down, the link cannot be backed up using the communication links 34 and 35 as indicated by the dotted line of FIG. 1. As a result, the sequence of operations (1) to (5) occurs, for example.

(1) When the router 910 operates in a master mode and the router 920 operates in a backup mode, a network failure 41 occurs in the communication link 33 between the hubs 10 and 20, and the network 300 is shut down in the communication link 33.

(2) The router 920 of a backup mode monitors reception of network diagnosis packets over time. The packets are periodically sent from the router 910 of a master mode. The router 920 detects a separation of the network 300 due to the occurrence of the network failure 41 on the basis of the fact that the reception of diagnosis packets is stopped. Then, the router 920 is shifted to the master mode due to its device failure tolerant function (for example, VRRP).

(3) The routers 910 and 920 are both in the master mode, so each router sends routing information to the center side router 500, for example, through the WAN 400.

(4) The center side router 500 selects the router 910 or 920 as NextHop on the basis of the received routing information. Which of the routers 910 and 920 is selected depends on circumstances. Here, assuming that the router 910 is selected as NextHop, terminals 1-1 to 1-*m* subordinate to the router 910 can transfer packets to the center side router 500 normally through the WAN 400.

(5) On the other hand, terminals 2-1 to 2-*n* subordinate to the router 920 that is not selected by the center side router 500 cannot transfer packets to the center side router 500 through the WAN 400.

As described above, if devices (for example, hubs) having no network redundancy function are used as relay units other than a router in the network 300, in the case where the network 300 is separated into plural small networks due to the occurrence of a network failure, the router provided outside the network 300 (for example, the center side router 500) cannot recognize the small networks in some cases, resulting in a problem that terminals in the unrecognized, separated small networks cannot receive/transmit packets from/to a router provided outside the network.

As described above, in such network configuration that redundant routers are used for routing packets to an external network but a communication link between relay units for routing packets in a network is not redundant, if the network is separated into plural small networks due to shutdown of the communication link between the relay units in the network, a router provided outside the network cannot recognize the separated small networks and terminals in the separated small networks cannot receive/transmit packets from/to the router provided outside the network in some cases.

Figure 3:
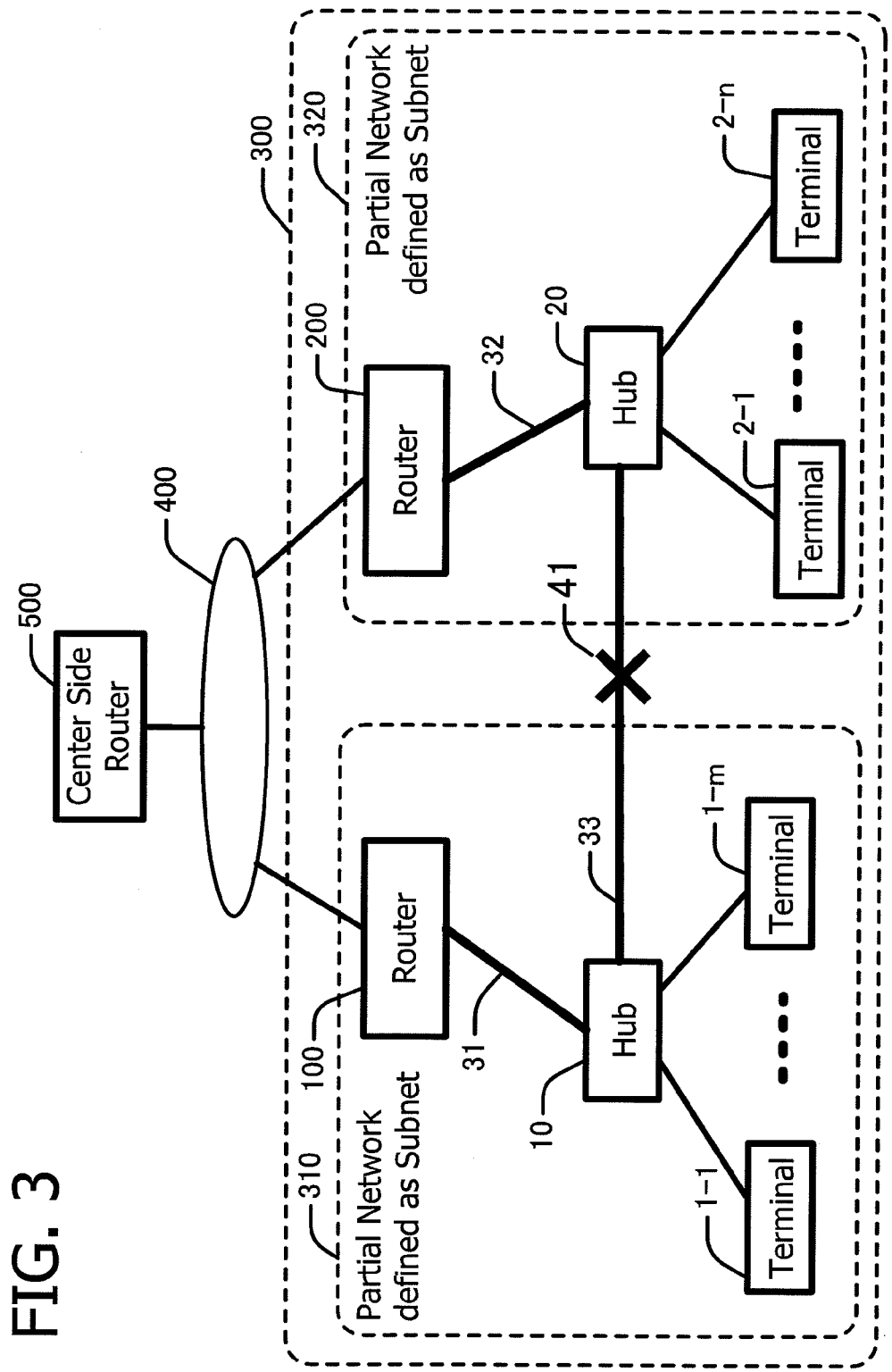
FIG. 3 schematically shows an example of a network reconfiguration method according to an embodiment.

FIG. 3 schematically shows a network reconfiguration method according to an embodiment.

It is assumed here that a network 300 is separated into two small partial networks 310 and 320 due to the occurrence of a network failure 41 in a communication link 33 between hubs 10 and 20, and m terminals 1-1, . . . , and 1-*m* and *n* terminals 2-1, . . . , and 2-*n* are subordinate to the small network 310 and 320, respectively.

In this case, routers 100 and 200 of the embodiment reconfigure a new subnet for each of the separated partial networks 310 and 320 and send routing information of the new reconfigured subnets to a center side router 500. As a result, the center side router 500 transfers packets on the basis of the received routing information of the new subnets and thus can normally transfer packets to the terminals subordinate to either the partial network 310 or 320.

In the example of FIG. 3, for ease of explanation, the network 300 is separated into the two partial networks 310 and 320. The following description also focuses on an example where a network is separated into two partial networks. However, the embodiment is applicable to the case of using three or more redundant routers and separating the network 300 into three or more partial networks at a time. For example, assuming that three redundant routers are provided, a third hub connected to a third router is connected to the hub 20, and a communication link between the third hub and the hub 20 is shut down concurrently with shutdown of a communication link between the hubs 10 and 20, the network 300 is separated into three partial networks, that is, the partial networks 310 and 320, and a partial network including the third router and the third hub. Each partial network is reconfigured as a new subnet.

Figure 4:
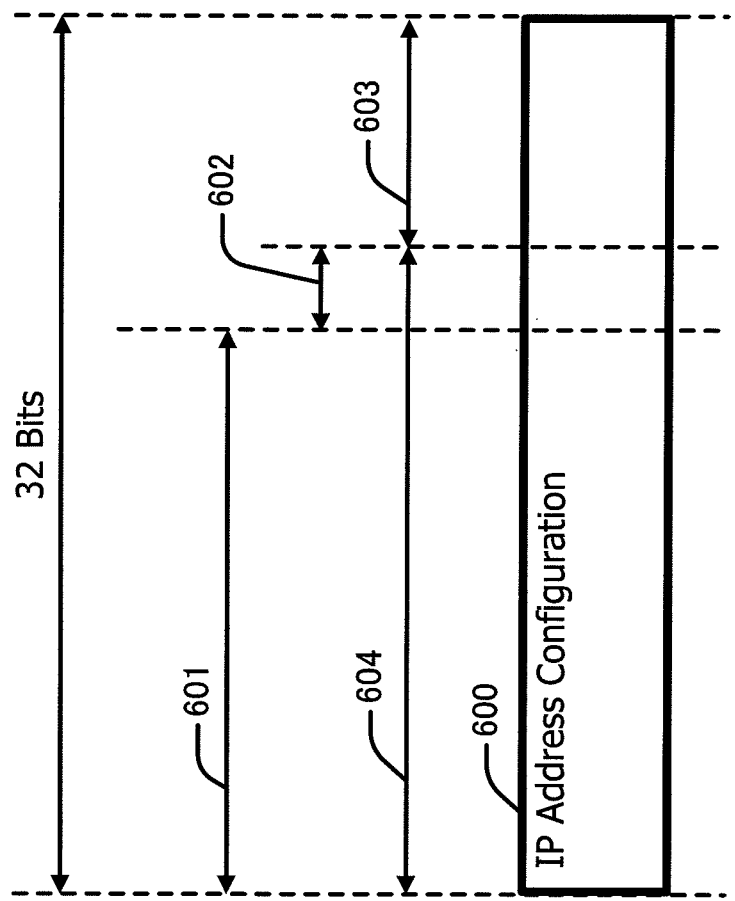
FIG. 4 schematically shows an example of IP address configuration according to the embodiment.

FIG. 4 schematically shows an example of an IP address configuration used in the embodiment.

In this example, a 32-bit IP address is described. An IP address 600 includes a network address portion 601, a subnet address portion 602, and a host address portion 603. Provided that bit information including the network address portion 601 and the subnet address portion 602 is defined as subnet identification information 604, the subnet identification information 604 can be used to uniquely identify a subnet to which the IP address 600 belongs in an IP network.

Bit information, in which "1" is set to all bits of the subnet identification information 604 and "0" is set to all bits of the host address portion 603, is referred to as a subnet mask. The logical AND between the subnet mask and the IP address 600 is performed to extract bit information of 32 bits including bit information set in the subnet identification information 604 and bit information set in the host address portion 603 with all bit values set to "0". The extracted bit information becomes identification information of the subnet to which the IP address 600 belongs, that is, a subnet address.

The subnet of the IP network can be defined by the subnet address information and the subnet mask information. A group of IP addresses included in each subnet is referred to as an IP address block. The IP address block can be defined by information on an IP address configuration as shown in FIG. 4. For example, if a 32-bit subnet address is represented by "AA.BB.CC.DD" and a bit length of the subnet mask is represented by "z", information on an IP address block that defines the subnet can be represented by "AA.BB.CC.DD/z". This representation is also called "prefix notation".

A concept of the subnet in the IP network has been well known. Thus, its detailed description is omitted here.

Hereinafter, for convenience of explanation, the expression of "information on an IP address block" that defines a subnet will be simply expressed as "an IP address block".

Figure 5:
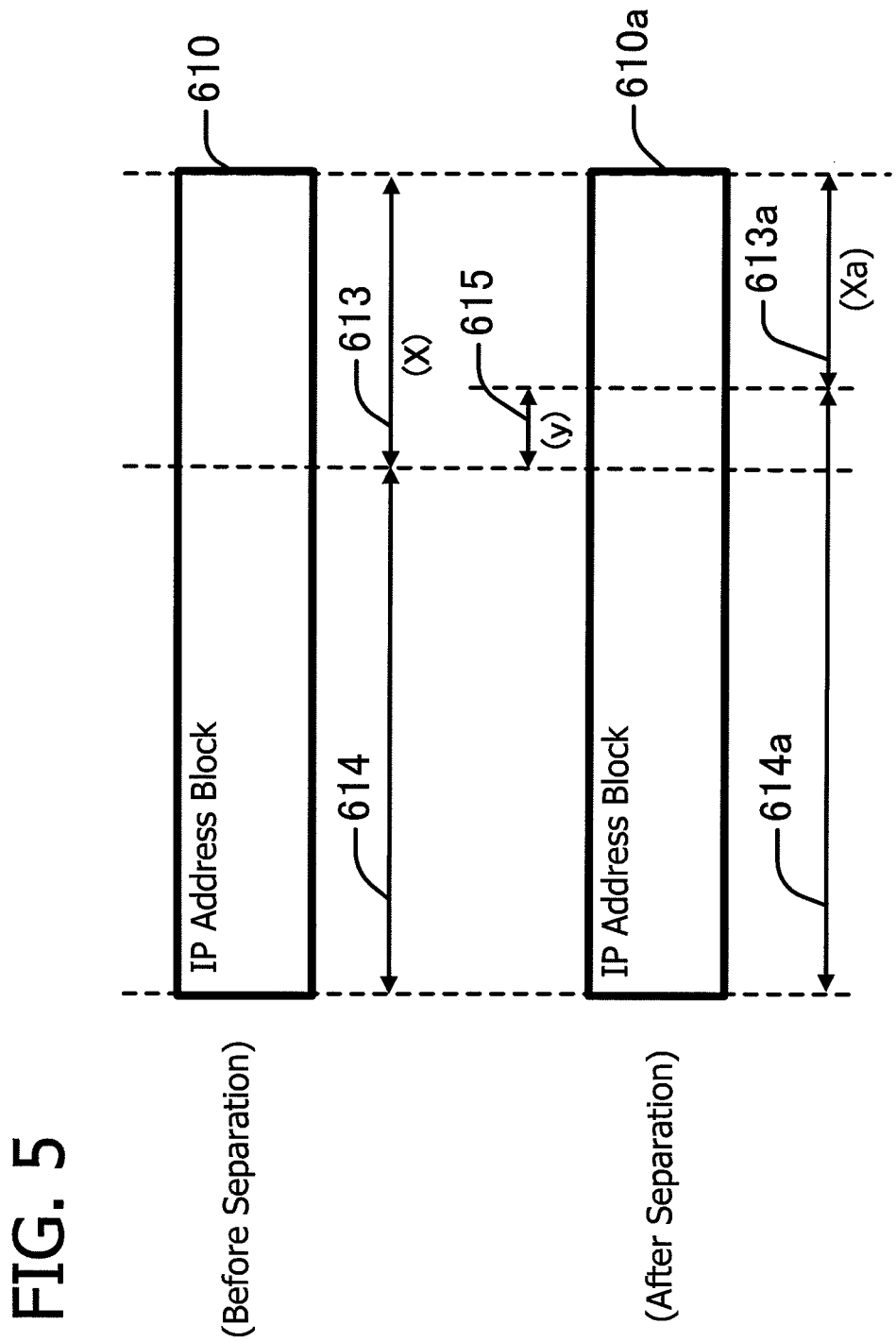
FIG. 5 schematically shows an example of a method of redefining an IP address block according to the embodiment.

FIG. 5 schematically shows a method of redefining an IP address block according to the embodiment. FIG. 5 illustrates definition of the IP address block for specifying a subnet in the form of comparing unseparated configuration and separated configuration of the network 300 of FIG. 3. In FIG. 5, reference numeral 610 denotes IP address block defining a subnet of the network 300 before separation; and 610*a* denotes IP address block defining a subnet of the partial networks 301 and 320 after separation. In this example, bit structures of the IP address block 610 before separation of the network 300 and the IP address block 610a after separation of the network 300, are illustrated in contract with each other.

Reference numeral 613 denotes a host address portion of the IP address block 610 before separation of the network 300, and X represents the number of bits thereof. Reference numeral 614 denotes a portion corresponding to the subnet mask in the IP address block 610 before separation of the network 300, that is, a bit area having a bit value of "1" in the subnet mask. In the network configuration example of FIG. 3, the terminals 1-1, ..., and 1-m and the terminals 2-1, ..., and 2-n in the network 300 are uniquely identified by the host address portion 613.

Reference numeral 613a denotes a host address portion of the IP address block 610a after separation of the network 300, and Xa represents the number of bits thereof. Reference symbol 614a denotes a portion corresponding to the subnet mask in the IP address block 610a after separation of the network 300. In the network configuration example of FIG. 3, the terminals 1-1, ..., and 1-m in the separated partial network 310 and the terminals 2-1, ..., and 2-n in the separated partial network 320 are uniquely identified by the host address portion 613a in each partial network.

Reference numeral 615 denotes differential bits corresponding to a difference between the bits X of the host address portion 613 of the IP address block 610 and the bits Xa of the host address portion 613a of the IP address block 610a. If y represents the number of differential bits, y=X−Xa. According to the embodiment, the IP address is reconfigured so as to identify each of separated partial networks by using the differential bit 615. Then, bit information that combines the subnet mask portion 614 of the IP address block 610 and the differential bit 615 is defined as a new subnet mask portion 614a to specify a new subnet mask. The thus-defined new IP address block and subnet mask are used to redefine the address block to thereby assign each of the separated partial networks with a subnet address described with reference to the IP address configuration of FIG. 4. As a result each partial network is reconfigured as a new subnet.

Consider the network configuration example of FIG. 3. It is determined whether or not the two separated partial networks 310 and 320 can be identified by the differential bit 615. In this case, the network is separated into two partial networks. Thus, if one or more bits can be secured as the differential bit 615, each small network could be identified. However, if a large number of terminals belong to one of the separated partial networks, for example, the number of terminals m in the partial network 310 is large and the bit length Xa of the host address portion 613a after separation becomes equal to the bit length X of the host address portion 613 before separation, the bit length y of the differential bit 613 becomes 0 and the differential bit 615 is not enough to identify separated partial networks. As a result, the IP address cannot be reconfigured and the IP address block cannot be redefined.

Figure 6:
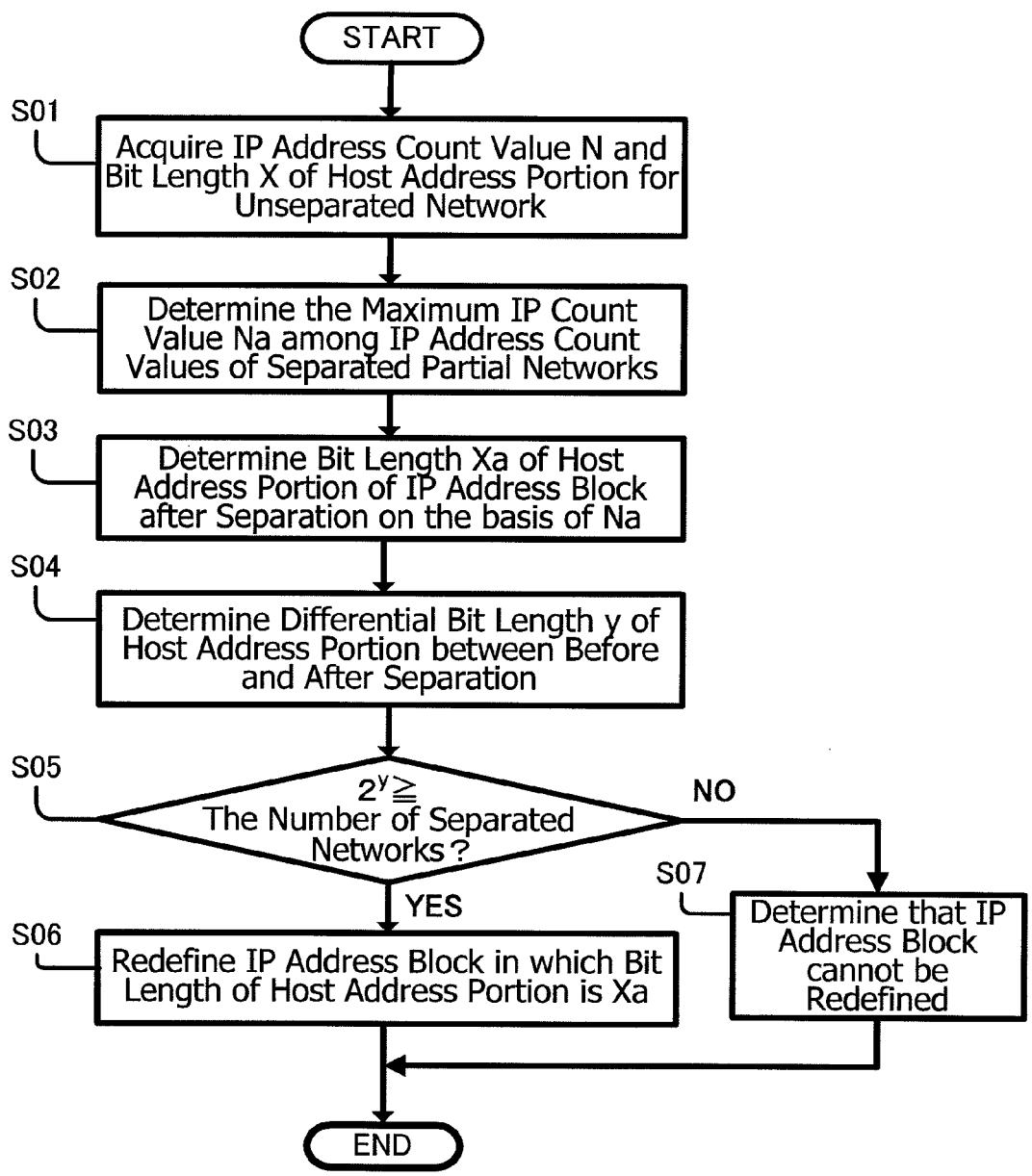
FIG. 6 shows an example of a method of redefining an IP address block according to the embodiment.

FIG. 6 shows an example of a method of redefining an IP address block according to the embodiment. FIG. 6 illustrates a redefinition procedure of the IP address block based on the configuration example of the IP address block of FIG. 5.

S01: the number of IP addresses N, or an IP address count value N, in the unseparated network 300 and a bit length X of the host address portion are acquired. The IP address count value N and the bit length X of the host address portion can be acquired by reading out the IP address count value and IP address blocks which were stored at the time of configuring the network 300 as a subnet.

The IP address count value N and the bit length X of the host address portion can be determined as follows.

The IP address count value N can be derived from the following expression:

$N=$ [the number of terminals in a network]+[the number of interfaces on LAN side of a router]+[the number of special addresses].

In the expression, [the number of interfaces on LAN side of a router] means the number of interfaces with a network to which each router belongs (not with the WAN), which is "2" in the network 300 of the network configuration example of FIG. 3. Further, [the number of special addresses] is fixed, which is 2 in FIG. 3, that is, a broadcast address and an all-zero address. Thus, in the network 300 of the network configuration example of FIG. 3, [the number of terminals in a network]=m+n, so N=m+n+4.

Next, the bit length X of the host address portion 613 may be defined as a length enough to cover IP addresses corresponding to the above IP address count value N. That is, the bit length X of the host address portion 613 of the IP address block 610 is determined to satisfy the following condition:

$$2^x \geq m+n+4$$

S02: The IP address count value is calculated for each separated partial network, and the maximum value among a plurality of the IP address count values calculated above is determined as the maximum IP address count value Na. Here, the IP address count value of each separated partial network can be calculated as in step S01.

For example, in the network configuration example of FIG. 3, if N1 and N2 represent the IP address count values of the separated partial networks 310 and 320, respectively, N1 and N2 can be calculated as follows in the same way as in step 01.

$$N1=m+3$$

$$N2=n+3$$

Thus, the maximum value of N1 and N2 is determined as the maximum IP address count value Na. For example, if m>n, Na=N1.

S03: A bit length Xa of the host address portion 613a of the IP address block after separation is determined based on the maximum IP address count value Na determined in step S02.

The bit length Xa of the host address portion 613a is set to a bit length enough for the host address portion 613a to identify the maximum number Na of IP addresses. That is, the bit length Xa is determined to satisfy the following condition:

$$2^{xa} \geq Na$$

At this time, in order to efficiently use bits of the IP address block, the minimum value of the bit lengths Xa can be determined as a final value Xa.

S04: A bit length of the differential bit 615 of the host address portion between before and after separation, that is, y=X−Xa is determined. The differential bit 615 is used as identification information for uniquely identifying separated partial networks.

S05: It is determined whether a relation of $2^y \geq$ [the number of separated networks] is satisfied. If satisfied (YES), the processing advances to step S06. If not satisfied (NO), the processing advances to step S07.

S06: The IP address block is redefined to complete the processing.

As for the redefinition of the IP address block, the bit length of the host address portion 613a is set to Xa determined in step S03 and bit information that combines the subnet mask portion 614 of the IP address block 610 before separation with the differential bit 615 determined in step S04 is set as the new subnet mask portion 614a to obtain a new subnet mask. Further, a value of the differential bit 615 determined in step S05 is assigned to each partial network to uniquely identify each separated partial network.

S07: In this case, the differential bit 615 is not enough to identify the separated partial networks, so it is determined that the IP address block cannot be redefined. Then, a message to that effect is sent to an operator of the network, for example, to complete the processing.

In this way, the IP address block is redefined for each of the separated partial networks, and each partial network is reconfigured as a new subnet based on the redefined IP address block. Thus, a network capable of handling a network failure can be configured using a relay unit (hub etc.) having no network redundancy function at a low cost.

Figure 7:
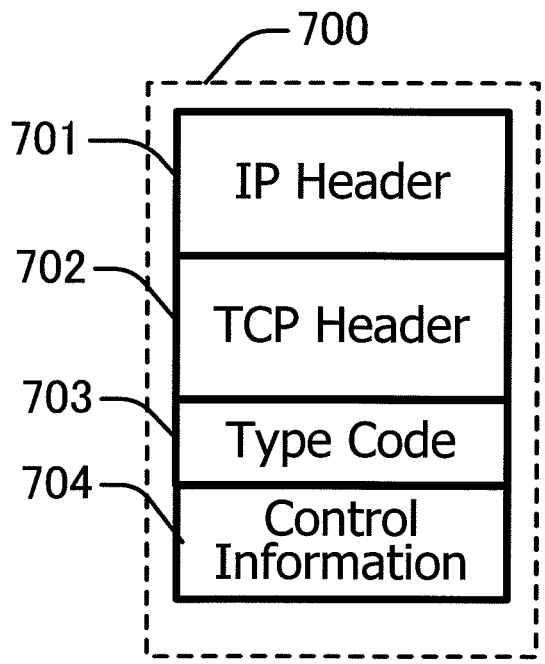
FIG. 7 schematically shows an example of a control packet configuration according to the embodiment.

FIG. 7 schematically shows a control packet configuration example for realizing the network reconfiguration method of the embodiment.

A control packet 700 of the present invention can be configured as an IP packet. The packet includes an IP header 701, a TCP header 702, a type code field 703, and a control information field 704.

The IP header 701 and the TCP header 702 could be understood based on a known IP protocol technique, so detailed description thereof is omitted here.

A port number set in the TCP header 702 can be used to distinguish the control packet of the embodiment from the other IP packets. That is, a predetermined port number is assigned for the control packet of the embodiment beforehand. Then, the control packet of the embodiment can be distinguished by determining the port number set in the TCP header 702 of received IP packets.

Code information for identifying a type of the control packet of the embodiment is set in the type code field 703. For example, as described below, an IP address count request packet, an IP address count value notification packet, an IP address block change notification packet, and a reconfiguration result notification packet can be configured to correspond to values of the type code field 703, "0", "1", "2", and "3", respectively.

The control information field 704 is an area where detailed information about control is set, and sizes thereof are different in accordance with the control packet type as described below with reference to FIGS. 8 to 11. In the embodiment, the network is reconfigured while transferring the control packets between redundant routers.

Figure 8:
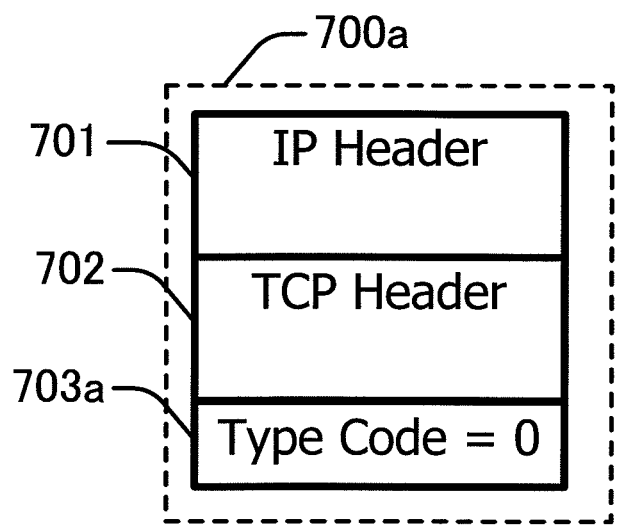
FIG. 8 shows an example of a control packet configuration according to the embodiment.

FIG. 8 shows a configuration example of an IP address count request packet 700*a* as an example of a control packet according to the embodiment. The IP header 701 and the TCP header 702 are similar to those of FIG. 7.

A type code "0" indicating the IP address count request packet is set to a type code field 703*a*. This IP address count request packet involves no control information field 704.

When receiving this packet, a router counts the number of devices each subordinate to the router and assigned with an IP address. That is, the router determines the total sum of the number of subordinate terminals, the number of IP addresses of LAN side interfaces of the router, and the number of special addresses.

Figure 9:
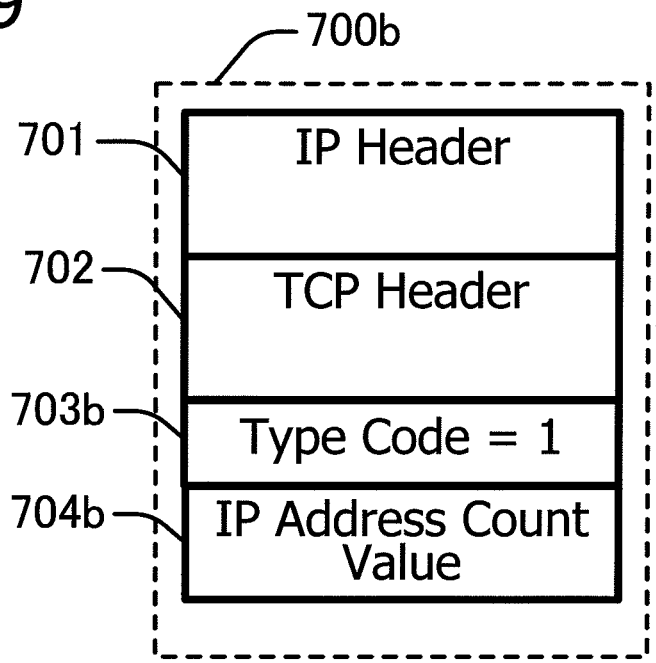
FIG. 9 shows an example of a control packet configuration according to the embodiment.

FIG. 9 shows a configuration example of an IP address count value notification packet 700*b* as an example of a control packet according to the embodiment. The IP header 701 and the TCP header 702 are similar to those of FIG. 7.

A type code "1" indicating the IP address count value notification packet is set to a type code field 703*b*.

The number of IP addresses counted in response to the instruction of the IP address count request packet of FIG. 8 is set in the control information field 704*b*.

The IP address count value notification packet 700*b* is sent back to a router which is a sender of the IP address count request packet of FIG. 8, as a response to the IP address count request packet.

Figure 10:
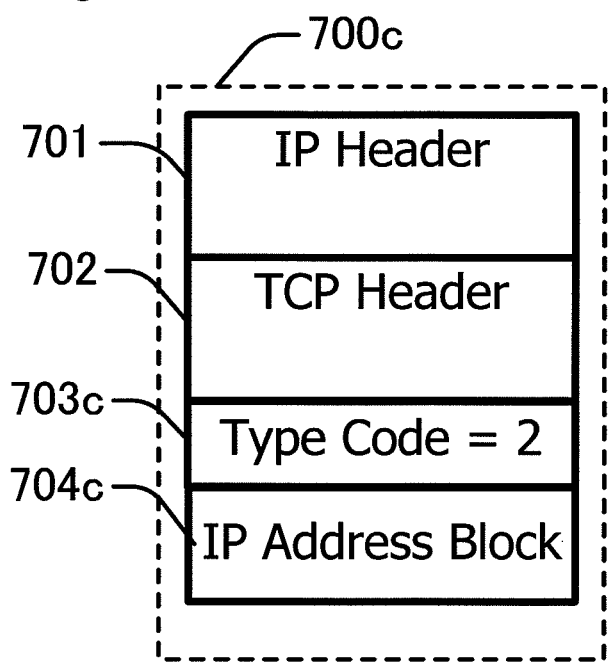
FIG. 10 shows an example of a control packet configuration according to the embodiment.

FIG. 10 shows a configuration example of an IP address block change notification packet 700*c* as an example of a control packet according to the embodiment. The IP header 701 and the TCP header 702 are similar to those of FIG. 7.

A type code "2" indicating the IP address block change notification packet is set to a type code field 703*c*.

An IP address block is set in the control information field 704*c*. When receiving the IP address block change notification packet, a router reassigns an IP address to subordinate terminals based on the redefined IP address block set in the control information field 704*c* to reconfigure a subnet corresponding to the notified IP address block.

A router that is shifted from the backup mode to the master mode due to a network failure obtains the numbers of IP addresses of separated partial networks using the IP address count request packet 700*a* and the IP address count value notification packet 700*b* and then redefines the IP address block. The router that redefines the IP address block uses the IP address block change notification packet 700*c* to notify a router of each separated partial network of the redefined IP address block.

Figure 11:
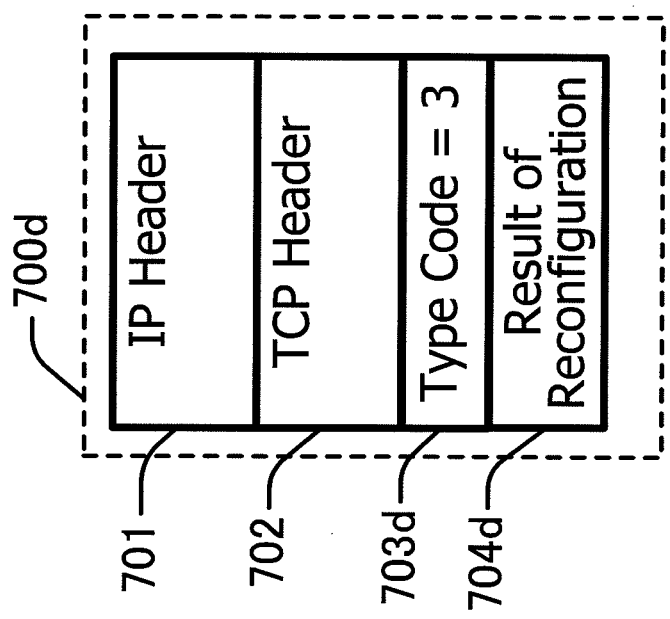
FIG. 11 shows an example of a control packet configuration according to the embodiment.

FIG. 11 shows a configuration example of a reconfiguration result notification packet 700*d* as an example of a control packet according to the embodiment. The IP header 701 and the TCP header 702 are similar to those of FIG. 7.

A type code "3" indicating the reconfiguration result notification packet is set to a type code field 703*d*.

Identification information representing whether a router succeeds or fails in subnet reconfiguration is set in the control information field 704*d*. For example, the information can be set such that "0" represents that a router succeeds in subnet reconfiguration and "1" represents that a router fails in subnet reconfiguration.

A router that is shifted from the backup mode to the master mode due to a network failure obtains the numbers of IP addresses of separated partial networks using the IP address count request packet 700*a* and the IP address count value notification packet 700*b*, and tries to redefine the IP address block. If the IP address block cannot be redefined, the router can use the reconfiguration result notification packet to send a notification to that effect to an operator who monitors operating terminals.

Further, when a router receives the IP address block change notification packet 700*c* and successfully reassigns IP addresses to subordinate terminals based on the redefined IP address block set in the control information field 704*c* to complete reconfiguration of a subnet, the router can use the reconfiguration result notification packet to send a notification to that effect to an operator who monitors operating terminals.

Figure 12:
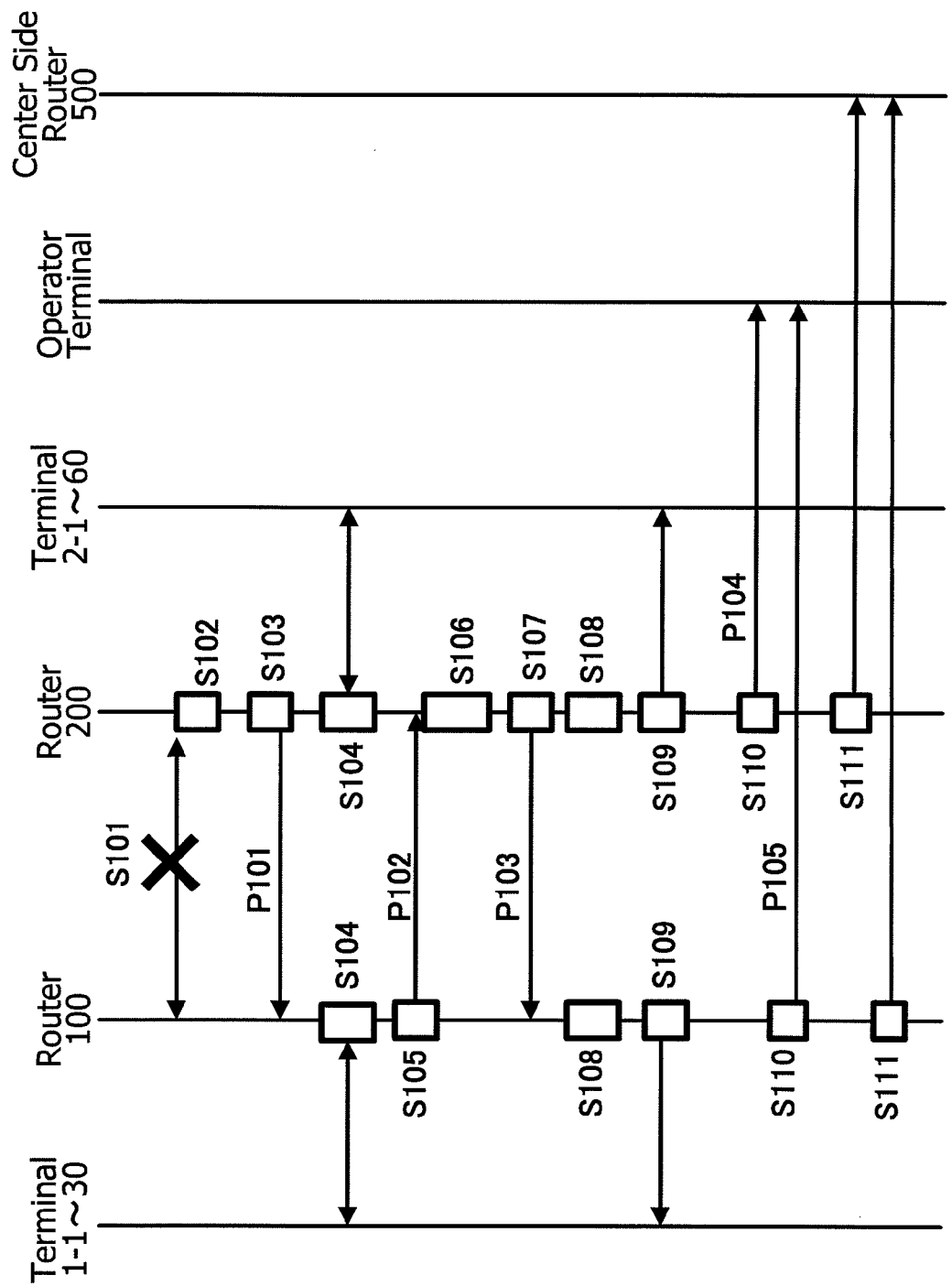
FIG. 12 shows an example of a processing sequence according to the embodiment.

FIG. 12 shows an example of a processing sequence (1) for realizing the network reconfiguration according to the embodiment. FIG. 12 illustrates an example of a processing sequence in the case where a router succeeds in subnet reconfiguration in association with the network configuration example of FIG. 3.

The network configuration example of FIG. 3 is a redundant device configuration in which the router 100 operates in a master mode to execute its main functions, and the router 200 operates in a backup mode.

In this example, the unseparated network 300 is divided into subnets based on the IP address block "AA.BB.CC.0/24". The network 300 is separated due to the network failure 41 and reconfigured as two partial networks 320 and 310 based on the IP address blocks "AA.BB.CC.0/26" and "AA.BB.CC.64/26", respectively.

In this case, it is assumed that the partial network 310 includes 30 terminals, that is, terminals 1-1 to 1-30, and the small network 320 includes 60 terminals, that is, terminals 2-1 to 2-60. In the unseparated network 300, each terminal is given one IP address of addresses in a range of "AA.BB.CC.01-254" based on DHCP. Further, in the following description, the terminal 1-1 is given an IP address "AA.BB.CC.5" and the terminal 2-2 is given an IP address "AA.BB.CC.211" for ease of explanation.

The routers are assigned with IP addresses as follows.
the WAN side interface of router 100: IP address "AA.BB.DD.1"
the LAN side interface of router 100: IP address "AA.BB.CC.10"
the WAN side interface of router 200: IP address "AA.BB.EE.1"
the LAN side interface of router 200: IP address "AA.BB.CC.10"

In FIG. 13, for convenience of explanation, values of main fields in the control packet used in the example of the processing sequence are shown in association with packet identification marks P101 to P105.

The detail of the example of the processing sequence is described below.

S101: when the router 100 operates in a master mode and the router 200 operates in a backup mode, a shutdown failure of the network 300, for example, the network failure 41 in the communication link 33 between the hubs 10 and 20 occurs.

S102: If the router 200 in the backup mode detects the shutdown of the communication link 33 between the hubs 10 and 20, the router shifts to the master mode in accordance with a technique of controlling redundancy of the router such as VRRP. According to the VRRP, diagnosis packets are sent from the router 100 of the master mode to the router 200 of the backup mode all the time at regular intervals. The router 200 of the backup mode monitors reception of the diagnosis packets, and determines that shutdown occurs in the communication link 33 between the hubs 10 and 20 if the diagnosis packets have not been received within a predetermined period.

S103: The router 200 shifted to the master mode transmits the IP address count request packet 700a (P101 of FIG. 12) to the other redundant router 100 through the WAN 400. Each router stores an IP address of the other redundant router on the WAN side (in the network configuration example of FIG. 3, the router 100 with respect to the router 200 or the router 200 with respect to the router 100) beforehand.

S104: The router 200 that sent the IP address count request packet 700a and the router 100 that received the IP address count request packet 700a, for example, apply proxy ARP, which is a known technique, to all IP addresses belonging to the separated networks 310 and 320, to obtain the IP addresses of subordinate terminals. In this example, 30 terminals, that is, terminals 1-1 to 1-30 are subordinate to the router 100, and 60 terminals, that is, terminals 2-1 to 2-60 are subordinate to the router 200. The number of IP addresses of each router can be recognized. Each of the routers 100 and 200 has one IP address and two special addresses for a LAN side interface. That is, the routers 100 and 200 recognize that 33 IP addresses and 63 IP addresses are assigned to their subordinate devices, respectively.

S105: The router 100 sends back the number of IP addresses (=33) assigned to devices subordinate to the router 100, which is determined in step S104, to the router 200 as a sender of the IP address count request packet 700a by use of the IP address count value notification packet 700b (P102 of FIG. 12).

S106: The router 200 receives the IP address count value notification packet 700b from the router 100. In the example of FIG. 12, two routers constitute a redundant system, but the same applies to three or more redundant routers. In this case, the router 200 receives the IP address count value notification packet 700b from plural routers and are notified of plural IP address count values.

The router 200 determines the maximum value among the at least one number of IP addresses notified using the IP address count value notification packet 700b and the number of IP addresses assigned to subordinate devices in the network 320, and defines the maximum value as a maximum IP address count value Na. Then, the router combines the same number of IP addresses as the maximum IP address count value Na into a subnet in the same way as in FIGS. 5 and 6, and redefines the IP address block so as to include the same number of subnets as the number of redundant routers, that is, the number of separated partial networks.

That is, the bit length Xa of the host address portion enough to cover the same number of IP addresses as the maximum IP address count value Na is determined to calculate a difference y from the bit length X of the host address portion before separation, thereby determining whether plural separated partial networks can be identified by the differential bit 615 of the determined bit length y.

In this case, the maximum IP address count value Na is set to "63" which is the number of devices subordinate to the router 200. The bit length Xa of the host address portion 613a enough to cover 63 IP addresses is "6". Therefore, a difference between the bit length X=8 of the 8-bit host address portion 613 before separation and the bit length Xa=6 of the host address portion 613a after separation is "2". The two separated partial networks can be identified using the 2 bits. For example, the IP address block is defined to identify the partial network 320 subordinate to the router 200 based on 2 bits "00" and to identify the partial network 310 subordinate to the router 100 based on 2 bits "01". As a result, the IP address block of the partial network 310 subordinate to the router 100 and the IP address block of the partial network 320 subordinate to the router 200 can be redefined as "AA.BB.CC.64/26" and "AA.BB.CC.00/26", respectively.

S107: The router 200 notifies the router 100 of the IP address block "AA.BB.CC.64/26" using the IP address block change notification packet 700c (P103 of FIG. 12).

S108: The routers 100 and 200 each changes a range of IP addresses assigned by its own DHCP function to a range of the IP address block determined and notified in step S106 and S107. Then, each router extracts a IP addresses not within a range of the new IP address block from the IP addresses assigned to devices subordinate to the each router, which are determined in step S104. For example, the new IP address block of the router 100 is "AA.BB.CC.64/26", so a range of IP addresses is "AA.BB.CC.64-127", and the terminal 1-1 (having IP address "AA.BB.CC.5") is a terminal having an IP address outside of the range. Further, the new IP address block of the router 200 is "AA.BB.CC.00/26", so a range of the IP address is "AA.BB.CC.00-63", and the terminal 2-1 (having IP address "AA.BB.CC.211") is a terminal having an IP address outside of the range.

S109: For example, a RENEW message which is known as a technique regarding DHCP is sent to the terminal having an address outside the range, which is extracted in step S108. As a result, IP addresses are reassigned in accordance with the processing of DHCP.

S110: After the completion of reassigning the IP addresses in step S109, the routers 100 and 200 notifies an operator terminal that a subnet is reconfigured using the reconfiguration result notification packet 700 (P104, P105 in FIG. 12).

S111: The routers 100 and 200 send routing information about subnets of the reconfigured partial networks 310 and 320, respectively, to the center side router 500 through the WAN 400.

Through the above processing sequence, the center side router 500 that externally communicates with the target network through the WAN 400 can recognize the partial networks 310 and 320 separated due to a network failure. As a result, packet transfers between the center side router 500 and the separated partial networks 310 and 320 can be performed normally from then on.

FIG. 13 shows an example of a control packet usage (1). FIG. 13 illustrates values of main fields in the control packet used in the processing sequence (1) of FIG. 12 in association with the packet identification marks P101 to P105, which are used in the processing sequence (1) of FIG. 12, for the convenience of explanation.

Figure 14:
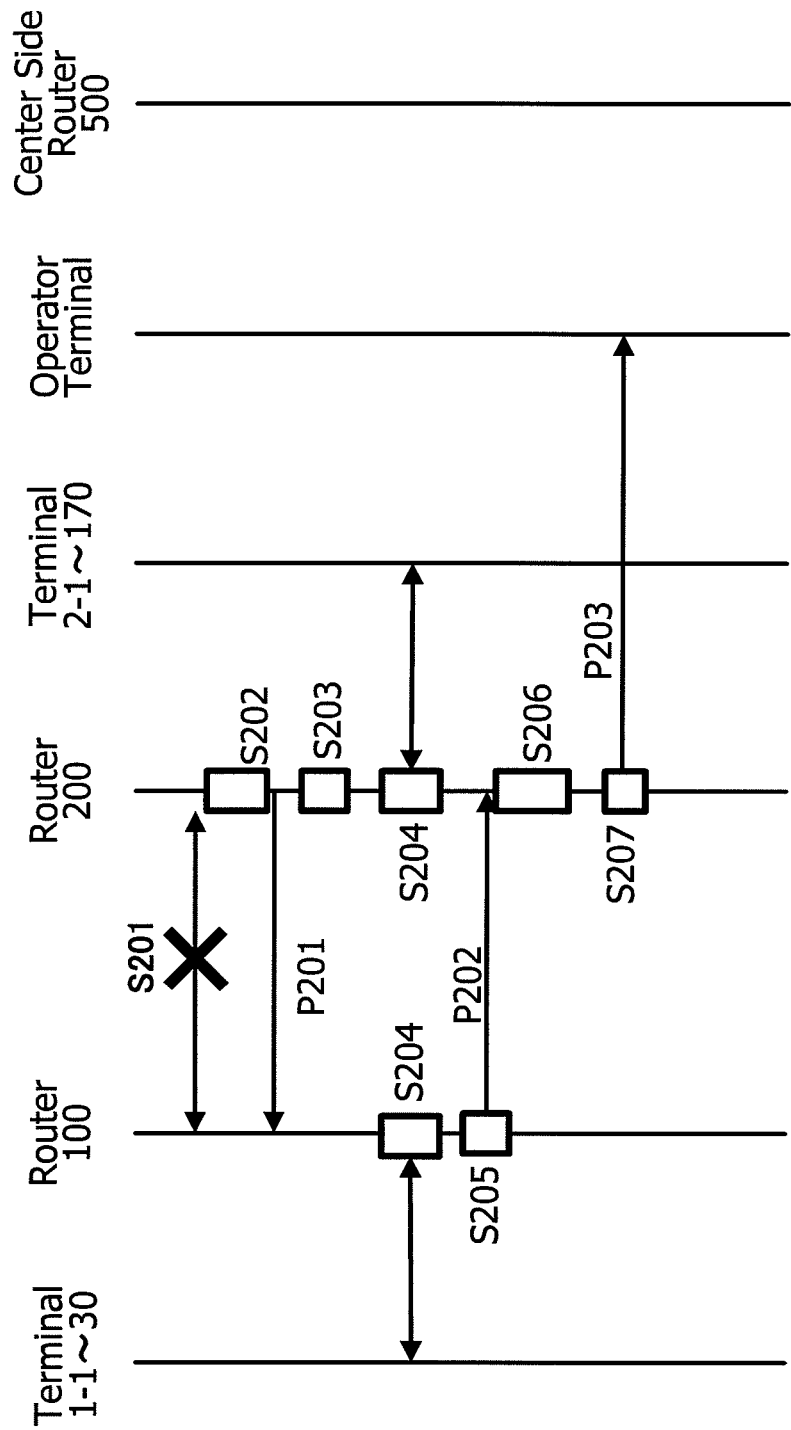
FIG. 14 shows an example of a processing sequence according to the embodiment.

FIG. 14 shows an example of a processing sequence (2) for realizing the network reconfiguration according to the embodiment. FIG. 14 illustrates a processing sequence example in the case where network cannot be reconfigured as a subnet in association with the network configuration example of FIG. 3.

The network configuration example of FIG. 3 is a redundant device configuration in which the router 100 operates in a master mode to execute its main functions, and the router 200 operates in a backup mode.

In this case, it is assumed that the partial network 310 includes 30 terminals, that is, terminals 1-1 to 1-30, and the partial network 320 includes 170 terminals, that is, terminals 2-1 to 2-170 for ease of explanation. Further, IP addresses of the routers are similar to those of FIG. 12.

FIG. 15 also illustrates values of main fields in the control packet used in the processing sequence (2) in association with the packet identification marks P201 to P203 for convenience of explanation.

The processing sequence (2) for realizing the network reconfiguration according to the embodiment is described below.

S201 to S205: These steps are similar to steps S101 to S105 of the processing sequence (1) of FIG. 12 in the case where a network can be reconfigured as a subnet (steps S101 to S105 correspond to steps S201 to S205, and P101 corresponds to P201) and thus are not repeated here.

S206: The router 200 receives the IP address count value notification packet 700b from the router 100 (P202 of FIG. 14). In the example of FIG. 14, two routers constitute a redundant system, but the same applies to three or more redundant routers. In this case, the router receives the IP address count value notification packet 700b from plural routers and is notified of plural IP address count values.

The router 200 determines the maximum value among at least one IP address count value notified using the IP address count value notification packet 700b and the number of IP addresses assigned to subordinate devices in the network 320, and defines the maximum value as a maximum IP address count value Na. Then, the router 200 combines the same number of IP addresses as the maximum IP address count value Na into a subnet in the same way as in FIGS. 5 and 6, and determines whether the IP address block can be redefined so as to include the same number of subnets as the number of redundant routers, that is, the number of separated partial networks.

That is, the bit length Xa of the host address portion enough to cover the same number of IP addresses as the maximum IP address count value Na is determined to calculate a difference y from the bit length X of the host address portion before separation. Then it is determined whether plural separated partial networks can be identified by the differential bit 615 of the determined bit length y.

In this case, the maximum IP address count value Na is set to "173" which is the number of devices subordinate to the router 200. The bit length Xa of the host address portion 613a enough to cover 173 IP addresses is "8". Therefore, a difference between the bit length X (=8) of the host address portion 613 before separation and the bit length Xa (=8) of the host address portion 613a after separation is "0". The determination condition described in step S05 of FIG. 6 is not satisfied, so the IP address block cannot be redefined. Therefore, the network cannot be reconfigured as a subnet.

S207: The router 200 notifies an operator terminal that the network 300 cannot be reconfigured as a subnet, using the reconfiguration result notification packet 700d (P203 of FIG. 14).

As described above, when the network 300 is separated due to a network failure, if the separated partial networks 310 and 320 cannot be reconfigured as subnets, the notification to that effect is sent to an operator terminal. Thus, the network operator can make an appropriate decision.

FIG. 15 shows a control packet usage example (2). FIG. 15 illustrates values of main fields in the control packet used in the processing sequence (2) of FIG. 14 in association with the packet identification marks P201 to P203, which are used in the processing sequence (2) of FIG. 14, for the convenience of explanation.

Figure 16:
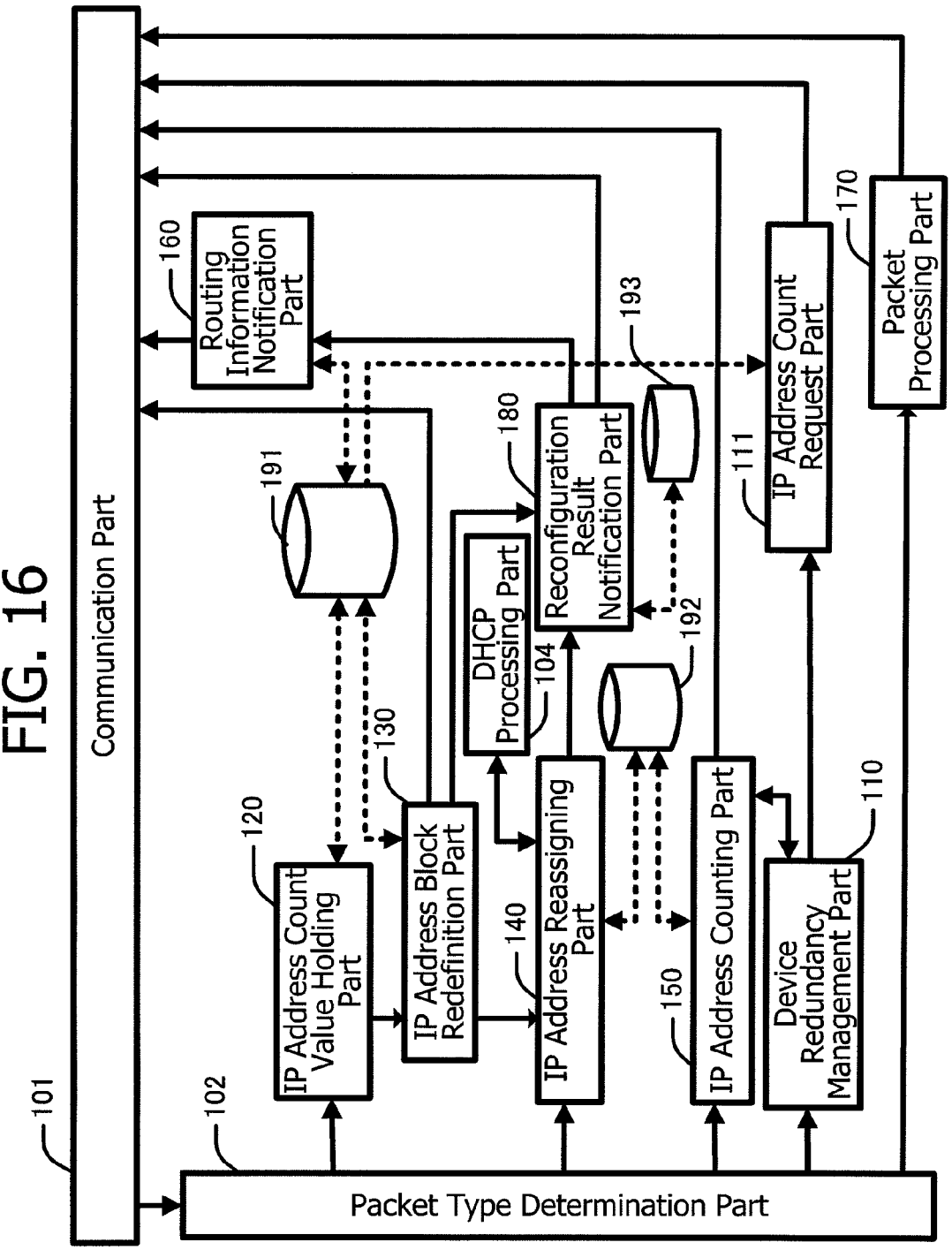
FIG. 16 shows a configuration example of a router according to the embodiment.

FIG. 16 shows a configuration example of a router for realizing the network reconfiguration according to the embodiment.

A communication part 101 transmits/receives packets between a router and a network.

A packet type determination part 102 determines whether a received packet is the control packet 700 of the embodiment. If the received packet is the control packet 700, the packet type determination part 102 determines a value of the type code field 703 in the packet to send the received packet to a processing part corresponding to each control packet.

That is, the packet type determination part 102 sends the received packet to an IP address counting part 150 if the type code 703 indicates the IP address count request packet 700a, to an IP address count value holding part 120 if the received packet is the IP address count value notification packet 700b, and to an IP address block redefinition part 130 if the received packet is the IP address block change notification packet 700c.

Further, if the received packet is a packet for controlling redundant device configuration (for example, packet for controlling VRRP), the packet type determination part 102 sends the received packet to a device redundancy management part 110. If the received packet is neither the control packet of the embodiment nor the packet for controlling redundant device configuration, the packet type determination part 102 sends the received packet to a packet processing part 170 which performs a conventional packet processing.

The device redundancy management part 110 controls the redundant router configuration based on any known technique such as VRRP. When the router shifts from the backup mode to the master mode, the device redundancy management part 110 notifies an IP address count request part 111 of the mode shift and in addition, calls the IP address counting part 150 to count up the number of IP addresses assigned to devices subordinate to a router to which the device redundancy management part 110 included and set the count result in an IP address count value field 1912 of router information corresponding to the router to which the device redundancy management part 110 included, in a router management information storage part 191 described later.

The IP address count request part 111 is invoked by the device redundancy management part 110 to generate the IP address count request packet 700a and to send it to each of redundant routers.

Figure 17:
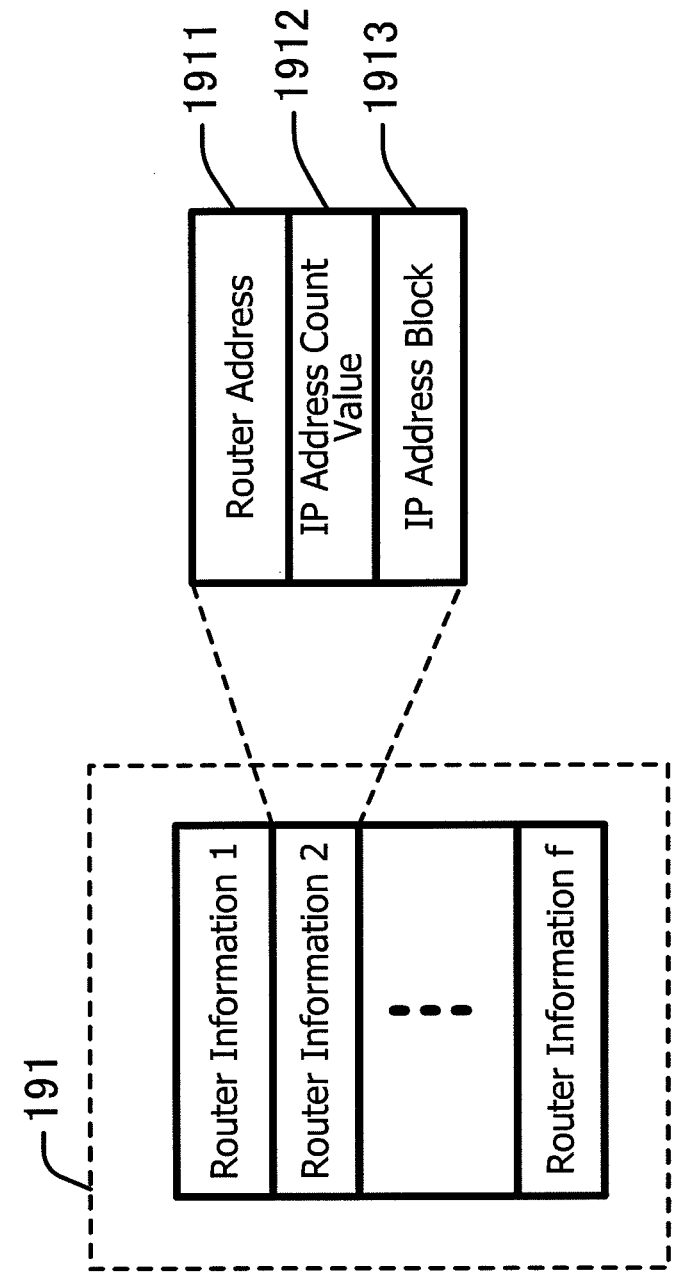
FIG. 17 shows a configuration example of a router management information storage part of a router according to the embodiment.

The IP address count value holding part 120 is invoked by the packet type determination part 102 upon receiving the IP address count value notification packet 700b to write the number of IP addresses stored in the IP address count value notification packet 700b to the IP address count value field 1912 of a record, in the router management information storage part 191, corresponding to a router from which the IP address count value notification packet 700b was transmitted, as described below with reference to FIG. 17. At this time, the IP address count value holding part 120 checks whether IP address count value fields 1912 have been written for all the redundant routers, that is, determines whether the number of IP addresses assigned to devices subordinate to a partial network has been counted for all separated partial networks. If not yet counted, the processing is terminated. If already counted, the IP address block redefinition part 130 is invoked.

The IP address block redefinition part 130 extracts the maximum value from among the numbers of IP addresses assigned to devices subordinate to each separated partial network, each of which is stored in a record of the router management information storage part 191, as the maximum IP address count value Na, to determine the new bit length Xa of the host address portion 613a in the same way as in FIGS. 5 and 6.

Then, the part 130 calculates the difference y between the bit length X of the host address portion before separation and the bit length Xa of the host address portion after separation to determine whether $2^y$ is equal to or larger than the number of separated partial networks.

If $2^y$ is equal to or larger than the number of separated partial networks, the address block can be redefined (a new address block can be defined). This means that the separated partial networks can be set as subnets based on the redefined IP address block. At this time, the IP address block is redefined and notified to each router using the IP address block change notification packet 700c, and then an IP address reassigning part 140 is invoked. On the other hand, each router that received the IP address block change notification packet 700c reassigns the IP addresses in each partial network based on the redefined IP address block, thereby reconfiguring each partial network as a subnet.

Alternatively, if $2^y$ is smaller than the number of separated partial networks, the address block cannot be redefined (a new address block 610a of FIG. 5 cannot be defined). Hence, a reconfiguration result notification part 180 is started to send the reconfiguration result notification packet 700d including information that the network cannot be reconfigured as a subnet, to an operator terminal.

The IP address reassigning part 140 extracts an IP address outside of a defined range of the IP address block, which is set in an IP address block field 1913 of a corresponding record in the router management information storage part 191 as described below with reference to FIG. 17, from the IP addresses stored in a subordinate terminal IP address storage part 192 which is described below with reference to FIG. 18. Then, the IP address reassigning part 140 instructs a DHCP processing part 104 to change the IP address to match with IP address block information 1913 to reassign the IP address. Then, after the completion of reassigning the IP address, the IP address reassigning part 140 instructs the reconfiguration result notification part 180 to notify an operator terminal that the network can be reconfigured as a subnet.

The reconfiguration result notification part 180 generates the reconfiguration result notification packet 700d and transmits the generated packet to the operator terminal through the communication part 101. If the reconfiguration result notification part 180 is invoked by the IP address reassigning part 140, it is the case that the IP address reassignment is completed. Thus, the reconfiguration result notification part 180 sets a value indicating successful reconfiguration (for example "0") as reconfiguration result information in the control information field 704d of the reconfiguration result notification packet 700d, and sends the reconfiguration result notification packet 700d to an operator terminal as well as sends routing information of the reconfigured subnet to an external network (WAN etc.) through a routing information notification part 160. Further, if the reconfiguration result notification part 180 is invoked by the IP address block redefinition part 130, it is the case that the address block cannot be redefined. Thus, the reconfiguration result notification part 180 sets a value indicating failed reconfiguration (for example "1") as reconfiguration result information in the control information field 704d and sends the reconfiguration result notification packet 700d to an operator terminal.

A DHCP processing part 104 assigns an IP address based on a known DHCP technique. For example, the DHCP processing part 104 sends a RENEW message of DHCP as a known technique to reassign the IP address.

The IP address counting part 150 is invoked by the packet type determination part 102 or the device redundancy management part 110 upon receiving the IP address count request packet 700a to obtain IP addresses of terminals subordinate to the router including the IP address counting part 150 included based on known ProxyARP or the like, to store the obtained IP address into the subordinate terminal IP address storage part 192.

Further, the IP address counting part 150 determines the number of IP addresses by adding the number of IP addresses (in general, one) assigned to a LAN side interface of the router including the IP address counting part 150, and the number of special addresses "2", to the obtained number of IP addresses of the subordinate terminals.

If the IP address counting part 150 is invoked by the packet type determination part 102 upon receiving the IP address count request packet 700a, the IP address counting part 150 transmits the IP address count value notification packet 700b where the obtained number of IP addresses is set, to a sender of the IP address count request packet 700a through the communication part 101. If the IP address counting part 150 is invoked by the device redundancy management part 110, the IP address counting part 150 notifies the device redundancy management part 110 of the obtained number of IP addresses.

The routing information notification part 160 is invoked by the reconfiguration result notification part 180 to inform a WAN side network of routing information about subnets defined by the IP address block of a corresponding router, which is stored in the router management information storage part 191 as described below with reference to FIG. 17.

The packet processing part 170 performs packet processing other than the device redundancy control processing and processing for the control packet of the embodiment.

FIG. 17 shows a configuration example of a router management information storage part of a router of the embodiment.

The router management information storage part 191 is constituted of one or more records storing management information about redundant routers. In FIG. 17, "f" denotes the number of redundant routers.

Each record corresponds to each of the redundant routers, and includes the router address field 1911, the IP address count value field 1912, and the IP address block field 1913.

The router address 1911 stores an IP address on the WAN side assigned to a redundant router. For example, in the processing sequence (1) of FIG. 12, "AA.BB.DD.1" and "AA.BB.EE.1" are stored in the router 100 and the router 200, respectively.

The IP address count value field 1912 stores the number of IP addresses on the LAN side of devices subordinate to separated partial networks. The IP address count value field 1912 stores the number of IP addresses of a partial network subordinate to the other router, which is stored in the IP address count value field of the IP address count value notification packet 700b received from the other router, or the number of IP addresses of a partial network subordinate to the router including the router management information storage part 191, which is counted by the IP address counting part 150 based on the ProxyARP. For example, in the processing sequence (1) of FIG. 12, the router 200 stores a value ("33") stored in the IP address count value field 1912 of the IP address count value notification packet 700b received from the router 100, and the number of IP addresses ("63") of devices subordinate to the router 200.

In the IP address count value field 1912, for example, a predetermined initial value is set to all records before separation of the network. In this case, after the separation of the network, a count value of IP addresses in each separated partial network is set in the IP address count value field 1912 of a corresponding record in chronological order. Therefore, it is determined whether the number of IP addresses is counted for all separated partial networks, by determining whether the values in the IP address count value field 1912 are still set to the initial value or not.

The IP address block field 1913 stores an IP address block for defining partial networks subordinate to each router.

In the IP address block field 1913, for example, an IP address block for defining a subnet of an unseparated network can be set to records corresponding to all routers before separation of the network. In this case, after the separation of the network, a router shifted from the backup mode to the master mode can utilize the IP address block field 1913 defining the subnet before separation of the network, when redefining the IP address block. For example, in the processing sequence (1) of FIG. 12, the routers 100 and 200 both store "AA.BB.CC.00/24" before a failure occurs. After redefining the IP address block, the routers 100 and 200 store "AA.BB.CC.64/26" and "AA.BB.CC.0/26" in the address block field 1913, respectively.

Figure 18:
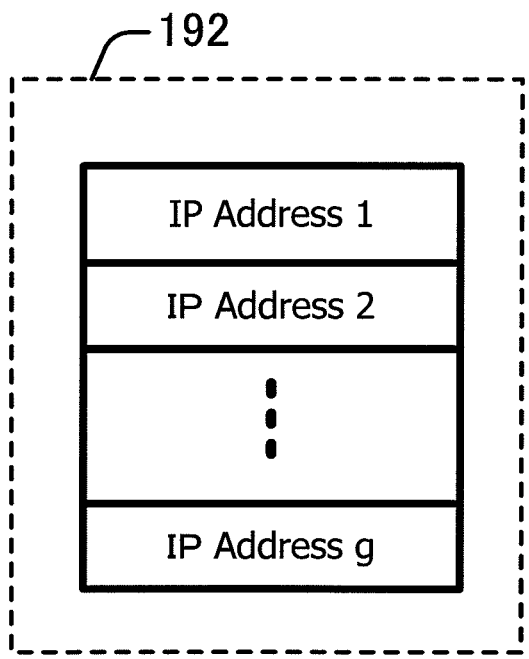
FIG. 18 shows a configuration example of a subordinate terminal IP address storage part of a router according to the embodiment.

FIG. 18 shows a configuration example of the subordinate terminal IP address storage part of the router according to the embodiment. The subordinate terminal IP address storage part 192 of the router according to the embodiment stores all IP addresses of subordinate terminals of the router including the subordinate terminal IP address storage part 192, which are obtained based on a known technique ProxyARP, for example. In FIG. 18, "g" represents the number of IP addresses.

Figure 19:
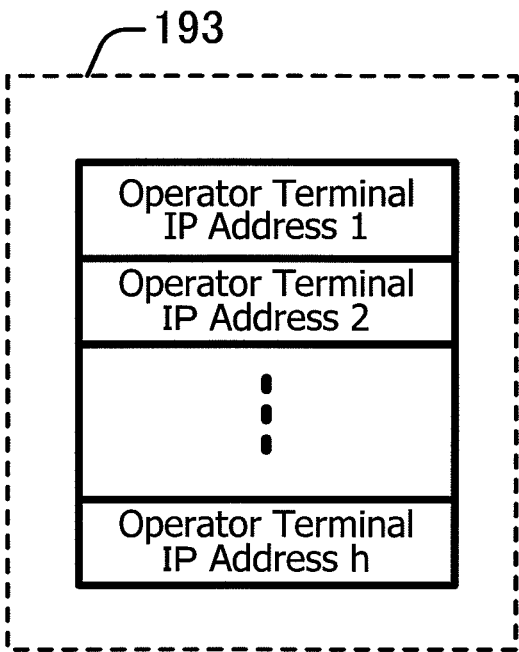
FIG. 19 shows a configuration example of an operator terminal IP address storage part of a router according to the embodiment.

FIG. 19 shows a configuration example of an operator terminal IP address storage part of the router according to the embodiment. An operator terminal IP address storage part 193 stores one or more IP addresses of an operator terminal operated by a network operator. The operator terminal IP address storage part 193 is used to send the reconfiguration result notification packet 700d indicating whether the router succeeds in network reconfiguration according to the embodiment. In FIG. 19, "h" denotes the number of operator terminals.

The above description about the configuration examples of the embodiment is focused on the case where two redundant routers are prepared, and a network failure occurs in one position. In principle, however, the embodiment is also applicable to the case where a network is separated into three or more small networks at the same time. In this case, it would be easily understood that the three or more partial networks can be reconfigured as subnets.

What is claimed is:

1. A method for reconfiguring an initial network into first and second partial networks including respective first and second routers each communicably coupled to an external network, the method comprising:

configuring the initial network as a subnet by assigning initial IP addresses to devices within the initial network using an initial IP address block defining an initial address range of the initial IP addresses, the initial IP address block including an initial host address portion identifying relative positions of the initial IP addresses within the initial network;

detecting an interruption of data communication between the first and second routers;

determining that the initial network has been separated into first and second partial networks based on the detection of the interruption of data communication between the first and second routers;

defining first and second IP address blocks for assigning first and second IP addresses to devices within the respective first and second partial networks, the first IP address block defining a first address range of the first IP addresses and including a first host address portion identifying relative positions of the first IP addresses within the first partial network, the second IP address block defining a second address range of the second IP addresses and including a second host address portion for defining relative positions of the second IP addresses within the second partial network, wherein each of the first and second IP address blocks is defined so that the respective first and second address ranges are mutually disjoint and both are included in the initial address range, by defining the first and second host address portions each having a common bit length that is not greater than a bit length of the initial host address portion and is minimum among bit lengths each enabling the first and second host address portions to identify the first and second IP addresses, respectively;

configuring the first and second partial networks as subnets by assigning IP addresses that are generated based on the defined first and second IP address blocks, to devices within the first and second partial networks, respectively; and transferring packets between the devices in the first and second partial networks and the external network via one of the first and second routers, wherein the common bit length of the first and second host address portions is obtained by performing a procedure including:

counting a first set of in-use IP addresses that are currently used for the first partial network, to determine counted number of the first set of in-use IP addresses to be a first IP address count value for the first partial network; counting a second set of in-use IP addresses that are currently used for the second partial network, to determine counted number of the second set of in-use IP addresses to be a second IP address count value for the second partial network;

determining a value maximum between the determined first and second IP address count values to be a maximum IP address count value; and determining a minimum bit length of a bit sequence that enables the bit sequence to represent the determined maximum IP address count value, to be the common bit length.

2. The method of claim 1, wherein
the first and second IP addresses are obtained by changing IP addresses that are currently used within the initial address range and lie outside the respective first and second address ranges, into IP addresses that lie within the respective first and second address ranges.

3. The method of claim 1, wherein the sum of the number of IP addresses of terminals included in each of the first and second partial networks, the number of interfaces of a router corresponding to the each of the first and second partial networks, and the number of IP addresses for a predetermined purpose, is determined to be the IP address count value for the each of the first and second partial networks.

4. The method of claim 1, wherein information indicating whether each of the first and second partial networks has been configured as a subnet or not, is transmitted to an operator terminal for managing the initial network.

5. The method of claim 1, wherein the determining the maximum IP address count value is performed by one of the first and second routers that has detected the separation of the initial network, on the basis of an IP address count value notified from the other one of the first and second routers via the external network.

6. The method of claim 1, wherein
the defining the first and second IP address blocks is performed by one of the first and second routers that has detected the separation of the initial network, and
the assigning IP addresses for a partial network including the other one of the first and second routers is performed by the other one of the first and second routers when the other one of the first and second routers has been notified of the corresponding one of the first and second IP address blocks from the one of the first and second routers.

7. A router for reconfiguring an initial network into first and second partial networks including respective first and second routers each communicably coupled to an external network, the router serving as the first router, the router comprising:
a device redundancy management part to:
detect an interruption of data communication between the first and second routers; and
determine that the initial network has been separated into the first and second partial based on the detection of the interruption of data communication between the first and second routers:
an IP address block redefinition part to:
generate an initial IP address block for defining an initial address range of initial IP addresses to be used within the initial network, the initial IP address block including an initial host address portion identifying relative positions of the initial IP addresses within the initial network, and
generate, based on the determination of the separation of the initial network into the first and second partial networks, first and second IP address blocks so that the first IP address block defines a first address range of first IP addresses to be used within the first partial network and a first host address portion identifying relative positions of the first IP addresses within the first partial network, and so that the second IP address block defines a second address range of the second IP addresses and a second host address portion identifying relative positions of the second IP addresses within the second partial network;
an IP address counting part to count in-use IP addresses that are being used in the first partial network, and to determine the counted number of the in-use IP addresses as a first IP address count value for the first partial network;
an address count value holding part to receive a second IP address counting value from the second router; and
an IP address reassigning part to assign IP addresses to devices within the first partial network on the basis of the IP address block defined by the IP address block redefinition part, wherein when the device redundancy management part determines that the initial network has been separated into the first and second partial networks,
the IP address block redefinition part generates first and second IP address blocks so that the first and second address ranges are mutually disjoint and both included in the initial address range, by defining the first and second host address portions each having a common bit length that is not greater than a bit length of the initial host address portion and is minimum among bit lengths each enabling the first and second host address portions to identify the first and second IP addresses, respectively;
the IP address reassigning part configures the first partial network as a subnet by assigning IP addresses that are generated based on the defined first IP address block, to devices within the first partial network; and
the router transfers packets between devices in the first partial network and the external network via the first router, wherein
the IP address block redefinition part determines the common bit length by performing a procedure including:
counting a first set of in-use IP addresses that are currently used for the first partial network, to determine counted number of the first set of in-use IP addresses to be a first IP address count value for the first partial network;
counting a second set of in-use IP addresses that are currently used for the second partial network, to determine counted number of the second set of in-use IP addresses to be a second IP address count value for the second partial network;
determining a value maximum between the determined first and second IP address count values to be a maximum IP address count value; and
determining a minimum bit length of a bit sequence that enables the bit sequence to represent the determined maximum IP address count value, to be the common bit length.

8. The router of claim 7, wherein the IP address reassigning part obtains the first IP addresses by changing IP addresses that are currently used within the initial address range and lie outside the first address range, into IP addresses that lie within the first address range.

9. The router of claim 7, wherein the IP address counting part determines the sum of the number of IP addresses of terminals included in the first partial network including the router, the number of interfaces of the router, and the number of IP addresses for a predetermined purpose, to be the IP address count value of the first partial network.

10. The router of claim 7, further comprising:
a reconfiguration result notification part to notify an operator terminal for managing the initial network, of information indicating whether the first partial network has been reconfigured as a subnet or not.

* * * * *